No. 877,192. PATENTED JAN. 21, 1908.
H. HESTAND & J. W. WILLIS.
STALK CUTTER ATTACHMENT FOR CULTIVATORS.
APPLICATION FILED JULY 11, 1907.

Inventors
Hardy Hestand and
John W. Willis

Witnesses
Arthur Wesley
C. H. Griesbauer

By H. B. Willson &co
Attorneys

UNITED STATES PATENT OFFICE.

HARDY HESTAND AND JOHN W. WILLIS, OF COMANCHE, OKLAHOMA.

STALK-CUTTER ATTACHMENT FOR CULTIVATORS.

No. 877,192.  Specification of Letters Patent.  Patented Jan. 21, 1908.

Application filed July 11, 1907. Serial No. 383,328.

*To all whom it may concern:*

Be it known that we, HARDY HESTAND and JOHN W. WILLIS, citizens of the United States, residing at Comanche, in District 29, Oklahoma, have invented certain new and useful Improvements in Stalk-Cutter Attachments for Cultivators; and we do declare the following to be a full, clear, and exact description of the invention, such as will enable others skilled in the art to which it appertains to make and use the same.

This invention has relation to new and useful improvements in stalk cutter attachments for cultivators, and has for its object the production of a simple and economical device of this character adapted to be readily and easily applied in operative position to a cultivator after the plows of the same have been removed.

With the foregoing and other objects in view, the invention consists of certain novel features of construction, combination and arrangement of parts, as will be more fully described and particularly pointed out in the appended claims.

Figure 1:
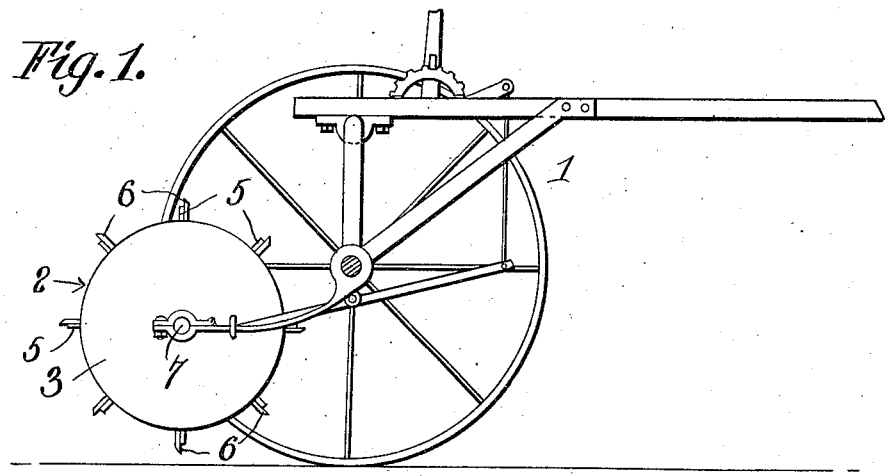
Figure 2:
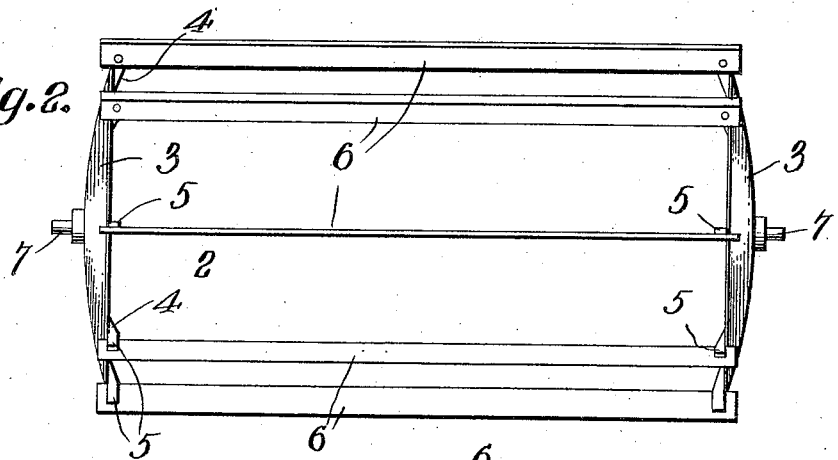
Figure 3:
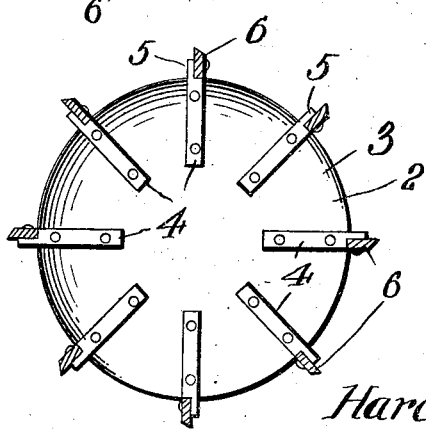

In the accompanying drawings:—Figure 1 is a side elevation of the stalk cutter applied in operative position to an ordinary cultivator after the plows of the same have been removed; Fig. 2 is a side elevation of the stalk cutter; and Fig. 3 a cross sectional view.

Referring to the drawings for a more particular description of the invention, 1 indicates an ordinary cultivator with the plows removed to enable the stalk cutter attachment 2 to be applied thereto. This attachment essentially comprises two oppositely disposed concavo-convex disks 3 having their concave faces toward each other, each having a plurality of radially projecting arms 4 fastened in any suitable manner to its inner face, said arms being preferably spaced equi-distances apart and extending beyond the peripheries or edges of the disks. Said arms 4 follow the inner curved surface of the disk and are bent at points adjacent the edges of the disks so as to be at right angles to the axial line of the disk and form longitudinally disposed projecting portions 5, to which may be fastened the ends of cutting knives or blades 6, arranged between the disks. Said arms 4 are cut away at the ends to form the flat portions 5, and a shoulder, against which and the edge of the disk, the cutting knives 6 are adapted to bear as shown. Suitable bearings 7 are bolted or otherwise fastened to the outer faces of the disks centrally of the same, whereby the attachment may be journaled or applied in position to the cultivation after the plows have been removed.

From the foregoing, it will be readily seen that our improved cultivator attachment is one of great merit, as its construction is such as to facilitate its ready attachment to a cultivator after first removing the plows, and because of these facts, means for cutting stalks are provided with a minimum of cost.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention.

Having described our invention, what we claim as new and desire to secure by Letters-Patent, is:—

A stalk cutter attachment, comprising two oppositely disposed concavo-convex end disks, the concaved face being toward each other, a plurality of outwardly extending arms secured to the inner concaved face of said end disks, cutaway portions at the end of each of said arms, said cut away portions forming flat faces radial to the axial line of said disks and shoulders perpendicular to said flat portions and substantially flush with the periphery of said disks, cutting knives connecting said disks and lying against said flat portions and said shoulders, and bearings to said end disks.

In testimony whereof we have hereunto set our hand in presence of two subscribing witnesses.

HARDY HESTAND.
JOHN W. WILLIS.

Witnesses:
S. J. CASTLMAN,
J. F. COPELAND.